(12) United States Patent
Sjödin et al.

(10) Patent No.: US 11,738,414 B2
(45) Date of Patent: Aug. 29, 2023

(54) METHOD FOR JOINING METAL PARTS

(71) Applicant: Alfa Laval Corporate AB, Lund (SE)

(72) Inventors: Per Sjödin, Lund (SE); Kristian Walter, Genarp (SE); Axel Knutsson, Lund (SE)

(73) Assignee: ALFA LAVAL CORPORATE AB, Lund (SE)

( * ) Notice: Subject to any disclaimer, the term of this patent is extended or adjusted under 35 U.S.C. 154(b) by 106 days.

(21) Appl. No.: 17/606,566

(22) PCT Filed: May 8, 2020

(86) PCT No.: PCT/EP2020/062864
§ 371 (c)(1),
(2) Date: Oct. 26, 2021

(87) PCT Pub. No.: WO2020/239395
PCT Pub. Date: Dec. 3, 2020

(65) Prior Publication Data
US 2022/0212295 A1    Jul. 7, 2022

(30) Foreign Application Priority Data
May 29, 2019  (SE) .................................. 1950640-1

(51) Int. Cl.
*B23K 1/00*        (2006.01)
*B23K 35/36*      (2006.01)
(Continued)

(52) U.S. Cl.
CPC ............ *B23K 35/3606* (2013.01); *B23K 1/20* (2013.01); *B23K 35/025* (2013.01); *B23K 35/3086* (2013.01); *B23K 2103/05* (2018.08)

(58) Field of Classification Search
CPC .... B23K 35/3606; B23K 1/20; B23K 35/025; B23K 35/3086; B23K 2103/05;
(Continued)

(56) References Cited

U.S. PATENT DOCUMENTS 1,741,031 A * 12/1929 Miller ................. B23K 35/3606
                                                              148/26
1,940,262 A * 12/1933 Lytle ................... B23K 35/3606
                                                              148/26
(Continued)

FOREIGN PATENT DOCUMENTS

CA      2896667 A1 *  7/2014  ......... C22B 15/0067
CA      2896670 A1 *  7/2014  ............... C25C 1/12
(Continued)

OTHER PUBLICATIONS

"Weiders Handbook" Manual Welding and Cutting Group, Mar. 1975, p. 668 (3 pages total).
(Continued)

*Primary Examiner* — Kiley S Stoner
(74) *Attorney, Agent, or Firm* — Birch, Stewart, Kolasch & Birch, LLP

(57) ABSTRACT

A method for joining a first metal part with a second metal part, the metal parts having a solidus temperature above 1100° C., includes applying a melting depressant composition on a surface of the first metal part, the melting depressant composition including a melting depressant component that includes at least 25 wt % boron and silicon for decreasing a melting temperature of the first metal part; bringing the second metal part into contact with the melting depressant composition at a contact point on said surface; heating the first and second metal parts to a temperature above 1100° C.; and allowing a melted metal layer of the first metal component to solidify, such that a joint is obtained at the contact point. The boron at least partly originates from a boron
(Continued)

compound selected from any of the following compounds: boric acid, borax, titanium diboride and boron nitride. The melting depressant composition and related products are also described.

20 Claims, 6 Drawing Sheets

(51) Int. Cl.
  *B23K 1/20* (2006.01)
  *B23K 35/02* (2006.01)
  *B23K 35/30* (2006.01)
  *B23K 103/04* (2006.01)

(58) Field of Classification Search
  CPC ........... B23K 2101/14; B23K 2101/18; B23K 2103/26; B23K 1/0012; B23K 1/008; B23K 1/19; B23K 20/026; B23K 20/16; B23K 20/227; B23K 20/233; B23K 20/24; B23K 35/001; B23K 35/004; B23K 35/0244; B23K 35/30; B23K 35/3617; B23K 35/362; B23K 1/0008; B23K 1/203; B23K 35/24; B23K 1/00–206
  USPC .................................. 228/193–195, 245–262
  See application file for complete search history.

(56) References Cited

U.S. PATENT DOCUMENTS

| | | | | |
|---|---|---|---|---|
| 2,174,551 | A | * | 10/1939 | Cinamon ........... B23K 35/3606 148/26 |
| 4,235,649 | A | | 11/1980 | Inamura et al. |
| 9,694,434 | B2 | | 7/2017 | Sjödin et al. |
| 9,849,534 | B2 | | 12/2017 | Sjödin et al. |
| 2015/0060030 | A1 | | 3/2015 | Sjödin et al. |
| 2016/0202005 | A1 | | 7/2016 | Sjödin et al. |
| 2016/0370134 | A1 | | 12/2016 | Kim et al. |
| 2018/0021894 | A1 | | 1/2018 | Persson et al. |

FOREIGN PATENT DOCUMENTS

| | | | | |
|---|---|---|---|---|
| CN | 2499892 | A1 | * 8/1982 | |
| CN | 101588890 | A | 11/2009 | |
| CN | 102027146 | A | * 4/2011 | ........... B23K 35/302 |
| CN | 103694812 | A | * 4/2014 | |
| CN | 104308387 | A | * 1/2015 | ......... B23K 35/0283 |
| CN | 105965178 | A | * 9/2016 | |
| CN | 104302440 | B | 12/2017 | |
| CN | 108883506 | A | 11/2018 | |
| CN | 110142278 | A | * 8/2019 | ........... B09B 3/0083 |
| CN | 110256045 | A | * 9/2019 | |
| CN | 110732803 | A | * 1/2020 | |
| CN | 111015017 | A | * 4/2020 | ............. B23K 35/30 |
| CN | 113265767 | A | * 8/2021 | ............. C03B 37/04 |
| EP | 0 465 637 | B1 | 9/1995 | |
| EP | 2 644 312 | A1 | 10/2013 | |
| EP | 2 853 333 | A1 | 4/2015 | |
| JP | 59-156587 | A | 9/1964 | |
| JP | 59-118291 | A | 7/1984 | |
| RU | 2 613 996 | C2 | 3/2017 | |
| SU | 1423331 | A1 | 9/1988 | |
| TR | 201409334 | A | * 2/2015 | |
| TW | I603802 | B | 11/2017 | |
| WO | WO-0038875 | A1 | * 7/2000 | ............... B23K 1/19 |
| WO | WO 02/38327 | A1 | 5/2002 | |
| WO | WO 2008/060225 | A1 | 5/2008 | |
| WO | WO 2013/144211 | A1 | 10/2013 | |
| WO | WO 2014/083222 | A1 | 5/2014 | |
| WO | WO-2014128714 | A1 | * 8/2014 | ............... C03C 1/02 |
| WO | WO 2015/043977 | A1 | 4/2015 | |
| WO | WO 2017/167597 | A1 | 10/2017 | |
| WO | WO 2018/108815 | A1 | 6/2018 | |

OTHER PUBLICATIONS

English translation of the Chinese Office Action and Search Report for corresponding Chinese Application No. 202080039235.5, dated Aug. 3, 2022.
Granovskii et al., "Flux for brazing iron to steels, nickel and copper—contains borax, sodium fluoride, sodium chloride, calcium chloride, amorphous boron and niobium fluoride", DERWENT, Feb. 16, 1987, XP002257237, Abstract.
International Search Report, issued in PCT/EP2020/062864, dated Jul. 3, 2020.
Written Opinion of the International Searching Authority, issued in PCT/EP2020/062864, dated Jul. 3, 2020.
English translation of Russian Office Action and Search Report for Russian Application No. 2021138883, dated Jul. 15, 2022.
Indian Office Action for Indian Application No. 202117060019, dated Jun. 29, 2022, with English translation.
English translation of Japanese Notice of Reasons for Rejection for Japanese Application No. 2021-570482, dated Nov. 21, 2022.

* cited by examiner

METHOD FOR JOINING METAL PARTS

TECHNICAL FIELD

The invention relates to a method for joining a first metal part with a second metal part by using a melting depressant composition. The invention also relates to the melting depressant composition and to products that comprise the joined metal parts.

BACKGROUND ART

Today there are different joining methods for joining metal parts (metal objects or metal work pieces) that are made of metallic elements, which metallic elements include various elemental metals as well as various metallic alloys. The metal parts in question have, by virtue of the metallic elements or alloys they are made of, a melting temperature of at least 1100° C., which means that the metal parts cannot be made of e.g. pure copper, pure aluminum or various aluminum-based alloys. Some examples of metal the metal parts may be made of are typically iron-, nickel- and cobalt-based alloys.

One common method for joining such metal parts is welding which is a method where the metal in the metal part with or without additional material is melted, i.e. a cast product is formed by melting and subsequent re-solidification.

Another joining method is brazing which is a metal-joining process where a filler metal first is applied on at least one of two metal parts to be joined and then heated above its melting point and distributed between the metal parts by capillary action. The filler metal is brought above its melting temperature, typically under protection by a suitable atmosphere. The filler metal then flows over the metal parts towards contact points where it forms joints.

Generally, when brazing, a filler metal is applied in contact with a gap or a clearance between the metal parts to be joined. During the heating process the filler metal melts and fills the gap to be joined. In the brazing process there are three major stages where the first stage is called the physical stage. The physical stage includes wetting and flowing of the filler metal. The second stage normally occurs at a given joining temperature. During this stage there is solid-liquid interaction, which is accompanied by substantial mass transfer. A small volume of the metal parts that immediately adjoins the liquid filler metal either dissolves or is reacted with the filler metal in this stage. At the same time a small amount of elements from the liquid phases penetrates into the solid metal parts. This redistribution of components in the joint area results in changes to the filler metal composition, and sometimes, the onset of solidification of the filler metal. The last stage, which overlaps the second, is characterized by the formation of the final joint microstructure and progresses during solidification and cooling of the joint. The volume of the metal parts that adjoins the liquid filler metal is very small, i.e. the joint is formed to the largest extent by the filler metal. Generally, when brazing, at least 95% of the metal in the joint comes from the filler metal.

Another method for joining two metal parts (parent materials) is transient liquid phase diffusion bonding (TLP bonding) where diffusion occurs when a melting point depressant (MPD) element from an interlayer moves into lattice and grain boundaries of the metal parts at the bonding temperature. Solid state diffusional processes then lead to a change of composition at the bond interface and the dissimilar interlayer melts at a lower temperature than the parent materials. Thus a thin layer of liquid spreads along the interface to form a joint at a lower temperature than the melting point of either of the metal parts. A reduction in bonding temperature leads to solidification of the melt, and this phase can subsequently be diffused away into the metal parts by holding at bonding temperature for a period of time.

Joining methods such as welding, brazing and TLP-bonding successfully joins metal parts. However, welding has its limitations as it may be very expensive or even impossible create a large number of joints when they are hard to access. Brazing has also its limitations, for example in that it sometimes it is hard to properly apply or even determine a most suitable filler metal. TLP-bonding as advantageous when it comes to joining different material but has its limitations. For example, it is often hard to find a suitable interlayer and the method is not really suitable for creating a joint where a large gap is to be filled or when a relatively large joint is to be formed.

Thus, many factors are involved when selecting a certain joining method. Factors that also are crucial are cost, productivity, safety, process speed and properties of the joint that joins the metal parts as well as properties of the metal parts per se after the joining. Even though the aforementioned methods have their advantages, there is still a need for a joining method to be used as a complement to the present methods, in particular if factors like cost, productivity, safety and process speed are taken into account.

Especially, it has been noted that in the most commonly used melting point depressant (MPD) system, in a Si—B system as for example disclosed by WO2013/144211 A1, the boron source used commonly is pure B. Pure boron (B) may provide technically good results, but is not optimal from a working safety point of view, availability and it is expensive. Therefore, in addition to improving the above techniques and the prior art there is a need to find improved boron sources from the working safety, sourcing and stainless steel compatibility point of view for melting point depressant (MPD) systems.

SUMMARY OF THE INVENTION

In view of the prior art, there is thus still a need to improve the above techniques and the prior art. The boron source used commonly is pure B. Pure boron (B) may provide technically good results, but is not optimal from a working safety point of view and is expensive.

Therefore, it is an object of the invention to provide an improved MPD system or melting depressant composition. In particular, it is an object to provide a method for joining metal parts (metal work pieces, i.e. work pieces or objects that are made of metal) in a simple and reliable manner while still producing a strong joint between the metal parts.

Furthermore, it is an objective to provide a boron source for a melting depressant composition, which provides good results in joining, while the compound is less harmful from a work-safety point of view and economic.

To attain these objects a method of for joining a first metal part with a second metal part is provided. The method is used for metal parts that have a solidus temperature above 1100° C. The method comprises:

applying a melting depressant composition at least on a surface of the first metal part, a melting depressant component comprising at least 25 wt % boron and silicon in total for decreasing a melting temperature of the first metal part, and optionally, a binder component for facilitating the applying of the melting depressant composition on the surface;

bringing the second metal part into contact with the melting depressant composition at a contact point on said surface;

heating the first and second metal parts to a temperature above 1100° C., said surface of the first metal part thereby melting such that a surface layer of the first metal part melts and, together with the melting depressant component, forms a molten metal layer that is in contact with the second metal part at the contact point; and allowing the melted metal layer to solidify, such that a joint is obtained at the contact point. According to the present disclosure, the boron at least partly originates from, or the boron source comprises, a boron compound selected from any of the following compounds: boric acid ($H_3BO_3$), borax ($Na_2B_4O_7$), titanium diboride ($TiB_2$) and boron nitride (BN) and/or combinations thereof. These compounds are safer from the work safety point of view than for example elemental boron while they provide strong joints. Further, these compounds have at most only small negative influence on metal parts to be joined, they have low cost, they are stable and safe to use.

The boron may originate from any of the boric acid, borax, titanium diboride, boron nitride and/or combinations thereof in an amount 15-100 wt %, or 50 to 100 wt %, based on the total weight of the boron. The boron may thus additionally originate from or comprise other boron sources or compounds. Examples of the other boron sources or compounds may be elemental boron (B), boron carbide ($B_4C$), silicon boride (e.g. in the form of silicon hexaboride $SiB_6$), nickel boride ($Ni_2B$) and/or iron boride ($Fe_2B$). However, since elemental boron is not optimal from a working safety point of view and is expensive, the boron may additionally originate from or comprise elemental boron up to 10 wt %, based on the total weight of the boron, which means that elemental boron is excluded to 90% by weight or more of boron as a boron source. According to a variant, the boron does not originate from or comprise elemental boron at all, i.e. elemental boron is excluded as a boron source. Further, to provide as strong joint as possible between metal parts of e.g. stainless steel, it is advantageous to decrease the amount of carbon. This is due to carbon forming chromium carbides with chromium in stainless steel, which may affect the corrosion features of the metal parts. Therefore, the amount of boron carbide should not exceed 85 wt %, based on the total weight of boron, which means that boron carbide is excluded to 15% by weight or more of boron as a boron source. The boron sources selected from silicon boride (e.g. in the form of silicon hexaboride $SiB_6$), nickel boride ($Ni_2B$) and/or iron boride ($Fe_2B$) can be present in an amount of up to 85% by weight, based on the total weight of boron.

However, preferably, the amount of the present boron source selected from boric acid ($H_3BO_3$), borax ($Na_2B_4O_7$), titanium diboride ($TiB_2$), boron nitride (BN) and/or combinations thereof is at least 15 wt %, preferably 50 wt %, or 60 wt %, or 70 wt % or 80 wt % or 90 wt % or 100 wt %, i.e. the boron source consists of any of or combinations of the present boron sources, based on the total weight of the boron. The higher the amount of the present boron sources, the safer work environment compared for example of using only elemental boron can be provided, while good results in joining are achieved. For example, titanium diboride has very good high-temperature properties, which is advantageous in methods for joining metal parts. The boron nitride may be provided in different forms such as the hexagonal form (h-BN), which is a stable crystalline form of boron nitride. Boron nitride is stable and safe from the working environment view. Boric acid and borax are also safer to use in working environments and are less expensive than for example elemental boron.

The metal in the metal parts may have the form of e.g. iron-, nickel and cobalt-based metallic alloys, as they typically have a solidus temperature above 1100° C. The metal parts may not be pure copper, copper-based alloys, pure aluminum or aluminum-based alloys that do not have a solidus temperature above 1100° C. The metal in the metal part or even the metal part per se may be referred to as the "parent metal" or "parent material". In this context, an "iron-based" alloy is an alloy where iron has the largest weight percentage of all elements in the alloy (wt %). The corresponding situation also applies for nickel-, cobalt-, chromium- and aluminum-based alloys.

As indicated, the melting depressant composition comprises at least one component, which is the melting depressant component. Optionally, the melting depressant composition comprises a binder component. All substances or parts of the melting depressant composition that contributes to decreasing a melting temperature of at least the first metal part is considered to be part of the melting depressant component. Parts of the melting depressant composition that are not involved in decreasing a melting temperature of at least the first metal part but instead "binds" the melting depressant composition, such that it forms e.g. a paste, paint or slurry, is considered to be part of the binder component. Of course, the melting depressant component may include other components, such as small amounts of filler metal. However, such filler metal may not represent more than 75 wt % of the melting depressant component, since at least 25 wt % of the melting depressant component comprises boron and silicon. If a filler metal is included in the melting depressant composition, it is always part of the melting depressant composition.

In this context, "boron and silicon" means the sum of boron and silicon in the melting depressant component, as calculated in (wt %), or alternatively expressed as % by weight. Here, wt % means weight percentage which is determined by multiplying mass fraction by 100. As is known, mass fraction of a substance in a component is the ratio of the mass concentration of that substance (density of that substance in the component) to the density of the component. Thus, for example, at least 25 wt % boron and silicon means that the total weight of boron and silicon is at least 25 g. in a sample of 100 g melting depressant component. Obviously, if a binder component is comprised in the melting depressant composition, then the wt % of boron and silicon in the melting depressant composition may be less than 25 wt %. However, at least 25 wt % boron and silicon are always present in the melting depressant component, which, as indicated, also includes any filler metal that may be included, i.e. filler metal is always seen as part of the melting depressant composition.

The "boron" includes all boron in the melting depressant component, which boron at least partly originates from a boron compound selected from any of the following compounds: boric acid ($H_3BO_3$), borax ($Na_2B_4O_7$), titanium diboride ($TiB_2$) and boron nitride (BN) and/or combinations thereof and may additionally comprise, elemental boron (B), boron carbide ($B_4C$), silicon boride (e.g. in the form of silicon hexaboride $SiB_6$), nickel boride ($Ni_2B$) and/or iron boride (e.g. $Fe_2B$). The amount of the boron originated from the source selected from boric acid ($H_3BO_3$), borax ($Na_2B_4O_7$), titanium diboride ($TiB_2$), boron nitride (BN) and/or combinations thereof is preferably at least 15 wt %, more preferably at least 50 wt %, or 60 wt %, or 70 wt % or 80 wt % or 90 wt % or 100 wt %, as described above, i.e. the boron source may consist of any of or combinations of the present boron sources, based on the total weight of the boron. Correspondingly, the "silicon" includes all silicon in the melting depressant component, which includes elemental silicon as well as silicon in a silicon compound. Thus, both the boron and silicon may, in the melting depressant component, be represented by the boron and silicon in various boron and silicon compounds.

Obviously, the melting depressant composition is very different from conventional brazing substances since they have much more filling metal relative melting depressing substances like boron and silicon. Generally, brazing substances comprise less than 18 wt % boron and silicon.

The method is advantageous in that filler metal may be reduced or even excluded and in that it may be applied for metal parts that are made of different materials. It may also be used within a wide range of applications, for example for joining heat transfer plates or any suitable metal objects that otherwise are joined by e.g. welding or conventional brazing.

Of course, the melting depressant composition may be additionally applied on the second metal part as well.

The silicon may originate from any of elemental silicon and silicon of a silicon compound selected from at least any of the following compounds: silicon carbide, silicon boride and ferrosilicon.

The melting depressant component may comprise at least 40 wt % boron and silicon, or may even comprise at least 85 wt % boron and silicon. This means that if any filler metal is present it is present in amounts of less than 60 wt % respectively less than 15 wt %. The melting depressant component may even comprise at least 95 wt % boron and silicon.

Boron may constitute at least 10 wt % of the boron and silicon content of the melting depressant compound. This means that, when the melting depressant component comprises at least 25 wt % boron and silicon, then the melting depressant component comprises at least at least 2.5 wt % boron. Silicon may constitute at least 55 wt % of the boron and silicon content of the melting depressant compound.

The melting depressant component may comprise less than 50 wt % metallic elements, or less than 10 wt % metallic elements. Such metallic elements corresponds to the "metal filler" discussed above. Such small amounts of metallic elements or metal filler differentiates the melting depressant composition starkly from e.g. known brazing compositions since they comprise at least 60 wt % metallic elements. Here, "metallic elements" include e.g. all transition metals, which are the elements in the d-block of the periodic table, which includes groups 3 to 12 on the periodic table. This means that, for example, iron (Fe), nickel (Ni), cobalt (Co), chromium (Cr) and molybdenum (Mo) are "metallic elements". Elements that are not "metallic elements" are the noble gases, the halogens and the following elements: boron (B), carbon (C), silicon (Si), nitrogen (N), phosphorus (P), arsenic (As), oxygen (O), sulfur (S), selenium (Se) and tellurium (Tu). It should be noted that, for example, that if the metal comes from the compound nickel boride, then the nickel-part of this compound is a metallic element that is included in the metallic elements that in one embodiment should be less than 50 wt % and in the other embodiment less than 10 wt %.

The first metal part may comprise a thickness of 0.1 to 1.0 mm, or 0.3-0.6 mm and the applying of the melting depressant composition may then comprise applying an average of 0.02-0.12, or 0.02-0.08 mg boron and silicon per $mm^2$ on the surface of the first metal part. The applying of an average of 0.02-0.12 mg boron and silicon per $mm^2$ on the surface of the first metal part and optionally the second metal part includes any direct application method e.g. by coating by spraying, painting or printing in case the melting depressant composition comprises a binder component, and by PVD or CVD in case not binder component is used. The printing method may be any suitable, for example screen printing. It is possible to apply the silicon in on layer and the boron in one layer, by painting or by PVD or CVD. Still, even if applied in layers both the boron and the silicon is considered to be included in the melting depressant composition since they will interact during the heating, just as if they were mixed before the applying. The application may also be done by an indirect application method, for example by transfer from the second metal part to the first metal part or vice versa. The indirect application may be thus performed for example for boron and silicon by transferring from the second metal part to the first metal part. Thus, the boron and silicon referred to herein must not necessarily have been applied directly on the first metal part, as long as it still contributes to the melting of the surface layer of the first metal part.

The first metal part may comprise a thickness of 0.1-1.0, or 0.6 to 1.0, or 0.3 to 0.6 mm and the applying of the melting depressant composition may then comprise applying an average of 0.02-1.0 mg boron and silicon per $mm^2$ on the surface of the first metal part. As before, the application includes also any direct or indirect "application" via the second metal part.

The first metal part may alternatively comprise a thickness of more than 1.0 mm and the applying of the melting depressant composition may then comprise applying an average of 0.02-5.0 mg boron and silicon per $mm^2$ on the surface of the first metal part.

The second metal part may comprise a thickness in the same ranges as the first metal part, or may be thicker or thinner than the first metal part.

The surface of the metal part may have an area that is larger than an area defined by the contact point on said surface, such that metal in the melted metal layer flows to the contact point when allowing the joint to form. Such flow is typically caused by capillary action.

The area of the surface may be at least 10 times larger than the area defined by the contact point. The area of the surface may be even larger (or the contact point relatively smaller), such as at least 20 or 30 times larger than the area defined by the contact point. The area of the surface refers to the area of the surface from where melted metal flows to form the joint.

The area of the surface may be at least 3 times larger than a cross-sectional area of the joint. The area of the surface may be even bigger (or the cross-sectional area of the joint relatively smaller), such as it is at least 6 or 10 times larger than the area defined by the contact point. The cross-sectional area of the joint may be defined as the cross-sectional area that the joint has across a plane that is parallel to the surface where the contact point is located, at a location where the joint has its smallest extension (cross sectional area).

The joint may comprise at least 50 wt % or at least 85 wt % or even 100 wt % metal (metallic element) that, before the heating, was part of any of the first metal part and the second metal part. This is accomplished by allowing metal of the metal parts to flow to the contact point and form the joint. A joint that is formed in this way is very different from joints that are formed by brazing, since such joints generally comprises at least 90 wt % metal that, before the brazing, was part of a filler metal of the a brazing substance that was used to form the joint.

Any of the first metal part and the second metal part may comprise a plurality of protrusions that extend towards the other metal part, such that, when bringing the second metal part into contact with said surface, a plurality of contact points are formed on said surface. This is typically the case when the metal parts have the shape of corrugated plates that are stacked and joined to form heat exchangers.

The first metal part may comprise any of:
i) >50 wt % Fe, <13 wt % Cr, <1 wt % Mo, <1 wt % Ni and <3 wt % Mn;
ii) >90 wt % Fe;
iii) >65 wt % Fe and >13 wt % Cr;
iv) >50 wt % Fe, >15.5 wt % Cr and >6 wt % Ni;
v) >50 wt % Fe, >15.5 wt % Cr, 1-10 wt % Mo and >8 wt % Ni;
vi) >97 wt % Ni;
vii) >10 wt % Cr and >60 wt % Ni;
viii) >15 wt % Cr, >10 wt % Mo and >50 wt % Ni;
ix) >70 wt % Co; and
x) >10 wt % Fe, 0.1-30 wt % Mo, 0.1-30 wt % Ni and >50 wt % Co.

The above means that the first metal part, and the second metal part as well, may be made of a large number of different alloys. Obviously, the examples above are balanced with other metals or elements, as common within the industry.

According to another aspect a product comprising a first metal part that is joined with a second metal part by a joint is provided. The metal parts have a solidus temperature above 1100° C. and the joint comprises at least 50 wt % metallic elements that have been drawn from an area that surrounds the joint and which area was part of any of the first metal part and the second metal part.

According to another aspect a product is provided which comprises a first metal part that is joined with a second metal part according to the method above or any of its embodiments.

According to another aspect a melting depressant composition is provided for, i.e. specifically developed and configured to, joining a first metal part with a second metal part according to the method above or any of its embodiments, the melting depressant composition comprising i) a melting depressant component that comprises at least 25 wt % boron and silicon for decreasing a melting temperature, and
ii), optionally, a binder component for facilitating applying of the melting depressant composition on the first metal part, wherein the boron originates from a boron compound selected from any of the following compounds: boric acid, borax, titanium diboride and boron nitride.

Different objectives, features, aspects and advantages of the method, the products and the melting depressant composition will appear from the following detailed description as well as from the drawings.

BRIEF DESCRIPTION OF THE DRAWINGS

Embodiments of the present disclosure will now be described, by way of example, with reference to the accompanying schematic drawings, in which.

DETAILED DESCRIPTION

Figure 1:
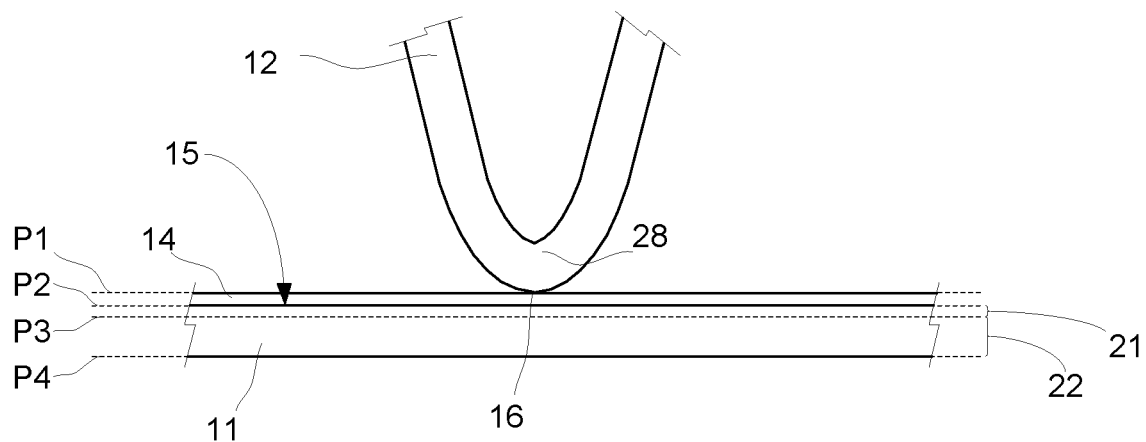
FIG. 1 is a cross-sectional view of a first and a second metal part where a melting depressant composition is applied intermediate the parts.

FIG. 1 shows a first metal part 11 and a second metal part 12 where a melting depressant composition 14 as described above is arranged on a surface 15 of the first metal part 11. The second metal part 12 is, at a contact point 16, in contact with the melting depressant composition 14 on the surface 15. For the illustrated second metal part 12, which has a U-shape, a protrusion 28 is in contact with the melting depressant composition 14 at contact point 16. The second metal part 12 may comprise further protrusions and thus there may be correspondingly further contact points. The first metal part 11 may be made of a metallic element made of an alloy comprising elements such as iron (Fe), chromium (Cr), nickel (Ni), molybdenum (Mo), manganese (Mn), and may be for example an iron-based alloy. Examples of suitable metallic elements the first metal part 11 may be made of are for example alloys Nickel 200/201, Nicrofer 5923hMo, Hastelloy® C-2000 Alloy, hastelloy B3, Alloy C22, Iconel 625, Alloy C 276, Nicrofer 3033, Nicrofer 3127HMo, AL6XN, 254SMO, Monel 400, Mild Steel, Stainless steel type 316, Stainless Steel Type 304, but the alloys are not limited to these alloys. The second metal part 12 is also made of a metallic element, which may be the same metallic element as the first metal part 11 is made of. In FIG. 1 the first metal part 11 and the second metal part 12 are not yet joined.

Four planes P1-P4 are used for describing how the first metal part 11 and the second metal part 12 are joined. The first plane P1 defines the surface of the melting depressant composition 14. The second plane P2 defines the surface 15 of the first metal part 11, which is an "upper" surface 15 of the first metal part 11. This means that the melting depressant composition 14 has a thickness that corresponds to the distance between the first plane P1 and the second plane P2 (the surface 15). It should be noted that the thickness of the melting depressant composition 14 is greatly exaggerated in the illustrated figures. The real thickness, i.e. the amount of the melting depressant composition 14 on the surface 15 as well as the composition of the melting depressant composition 14, is discussed in detail below.

The third plane P3 defines a surface layer 21 of the first metal part 11, where the surface layer 21 extends from the surface 15 and to the third plane P3 which is located in the first metal part 11. Thus, the thickness of the surface layer 21 corresponds to the distance between the second plane P2 (the surface 15) and the third plane P3. The fourth plane P4 defines a lower surface of the first metal part 11. The thickness of the first metal part 11 corresponds to the distance between the second plane P2 and fourth plane P4. The first metal part 11 has also a lower layer 22, which is the part of the first metal part 11 that does not include the surface layer 21 and which extends from the third plane P3 to the fourth plane P4. The illustrated shapes of the first metal part 11 and the second metal part 12 are just exemplifying shapes and other shapes are equally conceivable. For example, the metal parts 11, 12 may have curved shapes, such that the planes P1-P4 do not have the form of flat, two-dimensional surfaces, but instead the form of curved surfaces.

Figure 2:
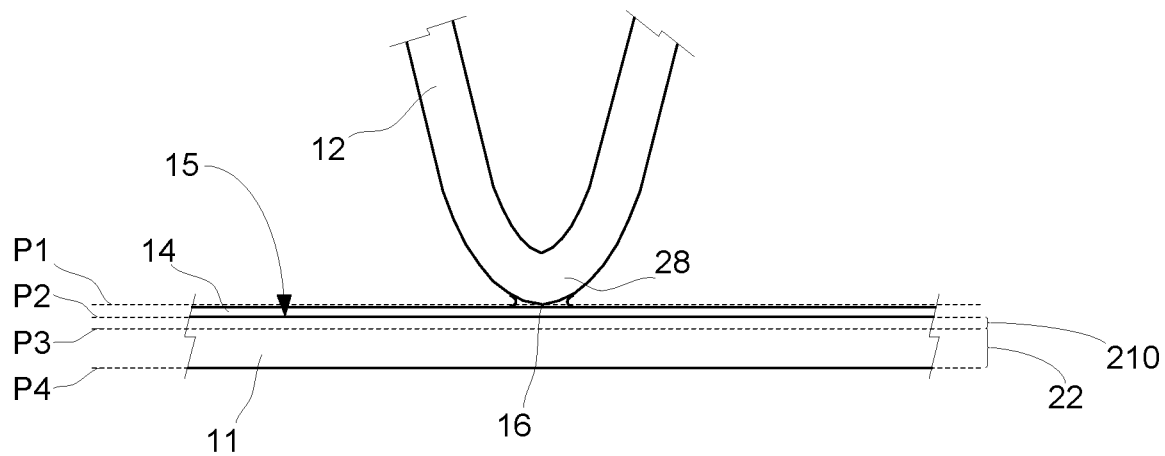
FIG. 2 shows the metal parts of FIG. 1 during heating.

FIG. 2 shows the metal components 11, 12 when they are heated to a temperature above which the melting depressant composition 14 causes the surface layer 21 to melt and form a molten metal layer 210, but at a temperature that is below a melting temperature of the material in the first metal part 11 and in the second metal part 12. In brief, when heating the metal parts 11, 12, boron and silicon in the melting depressant composition 14 diffuses into the first metal part 11 and causes it to melt at a temperature that is lower than the melting temperature of the material in the first metal part 11 (and of the second metal part 12). The melting depressant composition 14 is applied on the surface 15 at an amount that causes the surface layer 21 to melt and form the molten metal layer 210. Thus, the amount of melting depressant composition 14 is chosen so that boron and silicon diffuses only into the surface layer 21 (too much boron and silicon may melt the entire first metal part 11). Suitable amounts of the melting depressant composition 14 are described in the examples below. Metal in the molten metal layer 210 then flows, typically by capillary action, towards the contact point 16 (and to other, similar contact points such as contact point 116).

Figure 3:
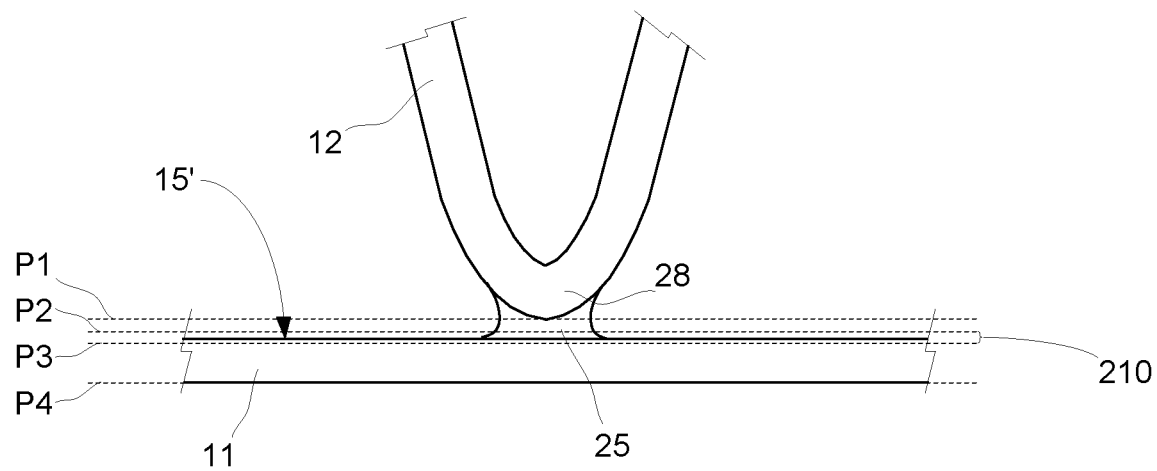
FIG. 3 shows the metal parts of FIG. 1 when a joint is formed.

FIG. 3 shows the metal components 11, 12 when all melting depressant composition 14 have diffused into the first metal part 11 and when metal in the molten metal layer 210 has flown towards the contact point 16 where a joint 25 now is formed. The joint now comprises metal that previously was part of the first metal part 11. As may be seen, the melting depressant composition 14 is no longer present on the surface 15 of the first metal part 11 since it has diffused into the first metal part 11 and, typically, to some extent into the second metal part 12. Since the joint 25 is formed from metal from the first metal part 11 the first metal part 11 is now thinner than before the heating. As may be seen, the first metal part 11 now has an upper surface 15' that is not located at the second plane P2. Instead, the upper surface is now closer to the fourth plane P4. Generally, not all metal in the melted metal layer 210 flows towards the contact point 16 to form the joint 25, but some remains as an upper surface of the first metal part 11 and solidifies there simultaneously with the solidification of the joint 25. The solidification takes place when the temperature is decreased but also prior a decrease of the temperature, e.g. because the boron and silicon in the melting depressant composition gradually diffuse into and mix with the material of the first metal part 11. The physical process behind the melting of the metal in the first metal part 11 as well as the subsequent solidification is similar with the melting and solidification process that occur during brazing. However, compared to conventional brazing there is a great difference in that the melting depressant composition 14 comprises no or very small amounts of filler metal; instead of using a filler metal for creating the joint 25, metal from the first metal part 11 and, optionally as will be described, from the second metal part 12, is used for creating the joint 25. Additionally, the present boron sources which can be selected from boric acid, borax, titanium diboride and boron nitride are less harmful from a work-safety point of view than for example elemental boron. Also, the boron sources of the present disclosure do not negatively affect corrosion properties of the metal parts as much as boron sources containing carbon (C), whereby strong joints with good corrosion properties can be provided.

Figure 4:
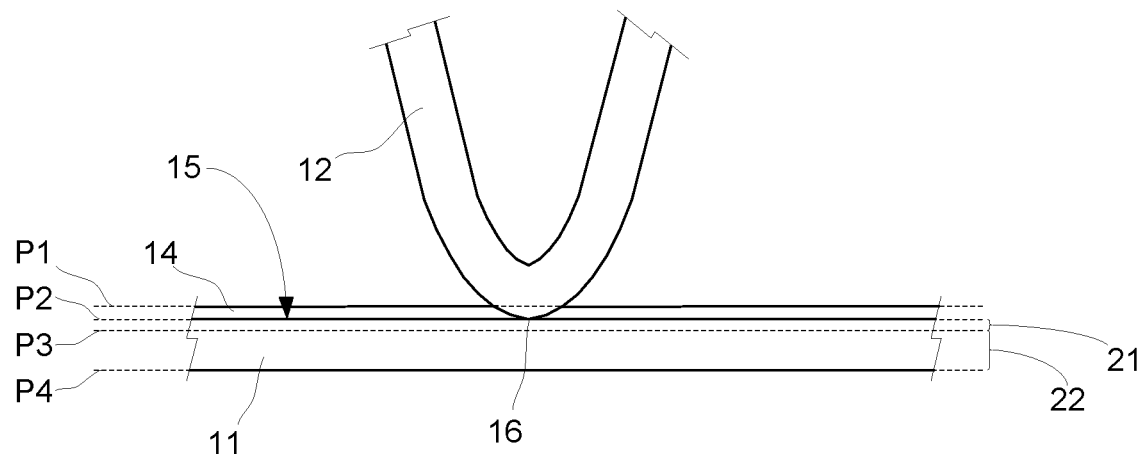
FIG. 4 is a cross-sectional view of a first and a second metal part where a melting depressant composition is applied intermediate the components and when the second metal part abuts the first metal part.
Figure 5:
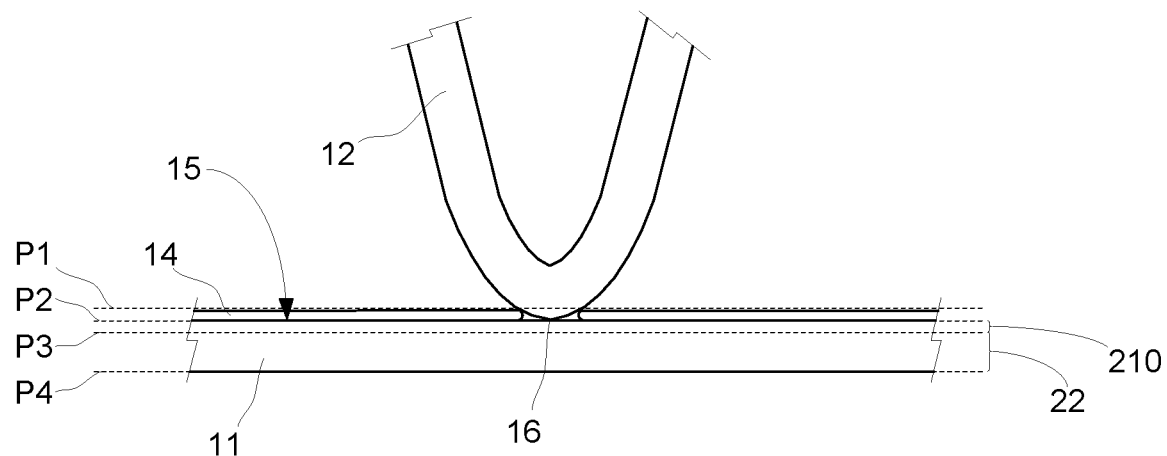
FIG. 5 shows the metal parts of FIG. 4 during heating.
Figure 6:
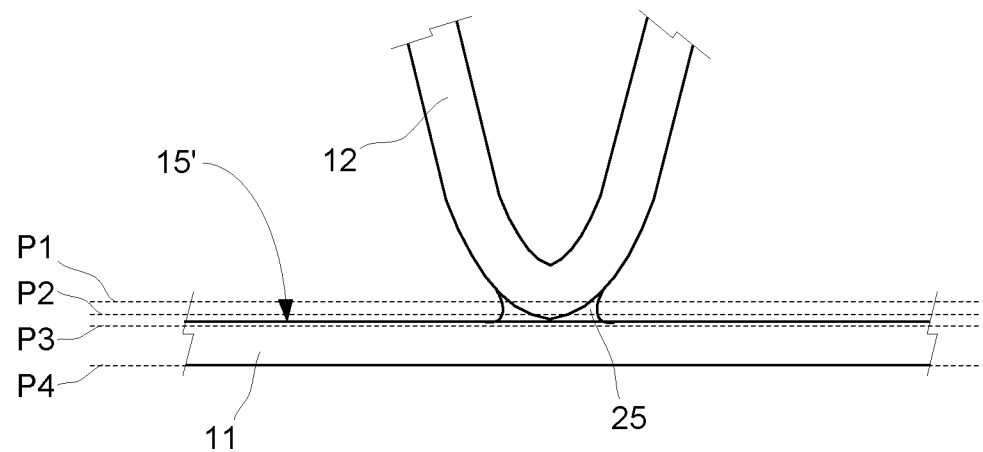
FIG. 6 shows the metal parts of FIG. 4 when a joint is formed.

FIGS. 4-6 corresponds to FIGS. 1-3 with the difference that the second metal part 12 is pressed into the melting depressant composition 14 to such an extent that it is basically in contact with or abuts to the first metal part 11 (some small amounts of the melting depressant composition 14 is still typically present between the metal parts 11, 12).

Figure 7:
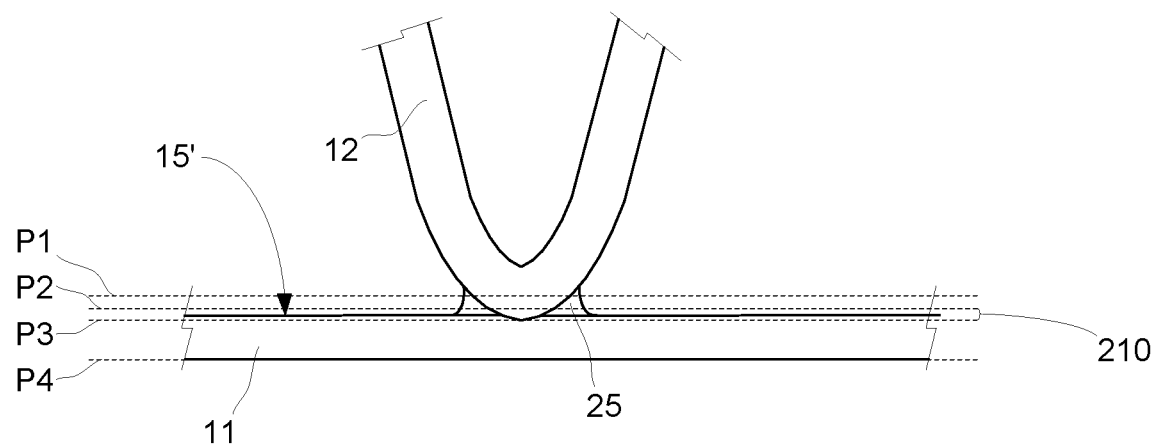
FIG. 7 shows metal parts when a joint is formed and where the parts have been pressed towards each other during the forming of the joint.

FIG. 7 corresponds to FIGS. 3 and 6 with the difference that the first metal part 11 and the second metal part 12 has been pressed towards each other during the forming of the joint 25. As a result the second metal part 12 has at the location of the joint 25 "sunk" into the melted metal layer 210 of the first metal part 11.

Figure 8:
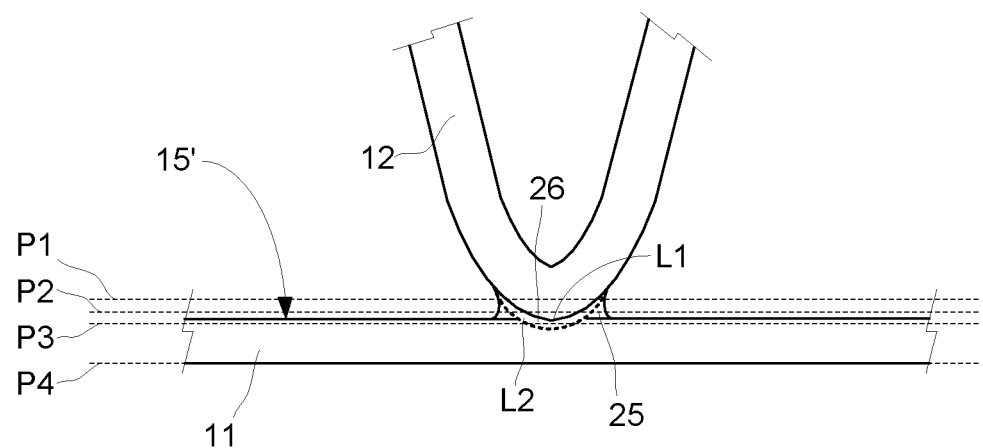
FIG. 8 is a view corresponding to FIG. 7, where material from both metal parts have melted and formed the joint, FIG. 9, corresponds to FIG. 1 and shows distribution of a contact point between the metal parts.

FIG. 8 corresponds to FIG. 7, where material from both the first metal part 11 and the second metal part 12 have melted and formed the joint 25. In practice, this is typically what happens during the forming the joint 25, especially if the first metal part 11 and the second metal part 12 are made of the same material, since the second metal part 12 also is in contact with the melting depressant composition.

Before heating, the second metal part 12 has an outer contour defined by the dotted line L2. During heating, a surface layer of the second metal part 12 forms a molten surface layer 26, where the metal of this layer flows to the contact point 16 and forms part of a joint 25 there. The molten surface layer of the second metal part 12 is represented by the layer between line L2 and line L1, where line L1 defines a boundary where the metal of the second metal part 12 has not been melted.

It should be noted that there is no real sharp boundaries between metal of the first metal part 11 and the second metal part 12 that is melted respectively is not melted. Instead, there is a gradual transition from "melted" to "not melted".

Figure 9:
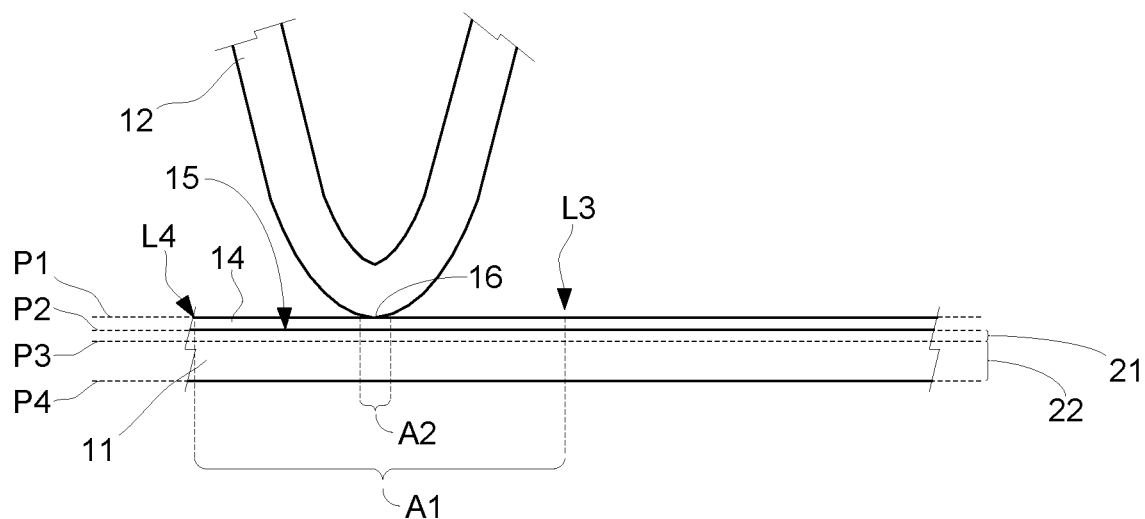
Figure 10:
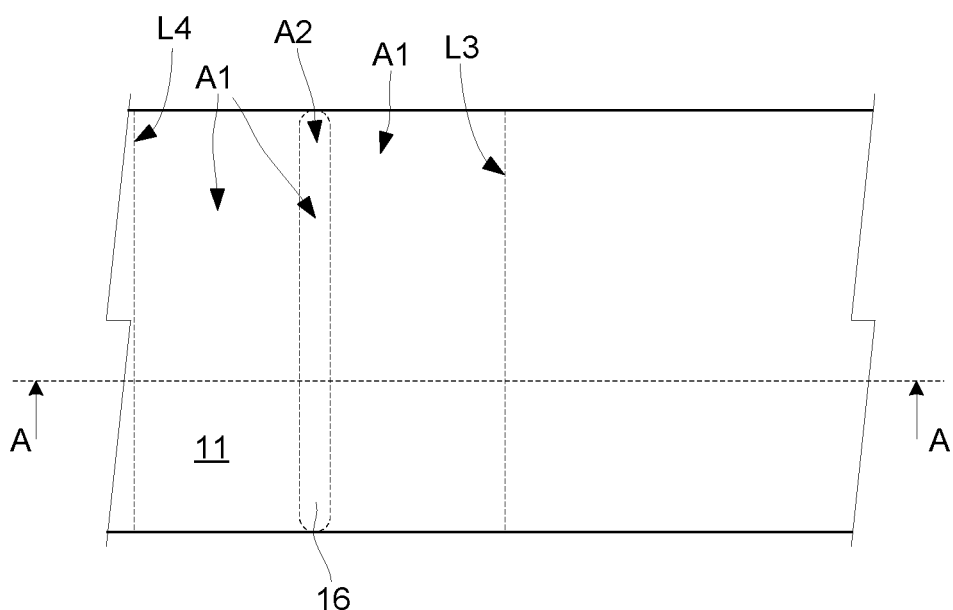
FIG. 10 shows an area of the contact point between the metal parts, FIG. 11, corresponds to FIG. 3 and shows distribution of a joint between the metal parts.

FIG. 9 corresponds to joint forming situation of FIG. 1 and shows a distribution of the contact point 16 between the first metal part 11 and the second metal part 12. FIG. 10 shows the same metal parts 11, 12 but from above and in the first plane P1. FIG. 9 is a cross-sectional view as seen along line A-A in FIG. 10.

As may be seen, the contact point 16 has a distribution over the melting depressant composition 14 on the first metal part 11. The distribution of the contact point 16 has an area A2 that is significantly smaller than an area A1 of the melting depressant composition 14 on the surface 15. The area A1 comprises the area A2. The area A1 extends between two lines L3, L4 that are located at a respective side of the contact point 16. The area A1 of the surface 15 on which the melting depressant composition 14 is applied can be at least 10 times larger than the area A2 defined by the contact point 16. The area A1 may be defined as an area of the surface 15 on which melting depressant composition 14 is applied and from which area A1 metal is drawn to the form the joint 25. The area A2 may be defined as the area of the contact point 16, i.e. the area of contact between the melting depressant composition 14 and the second metal part 12, optionally including an area of contact (if any) between the first metal part 11 and the second metal part 12 at the contact point 16. The area A1 can be at least 10 times larger than the area A2.

Figure 11:
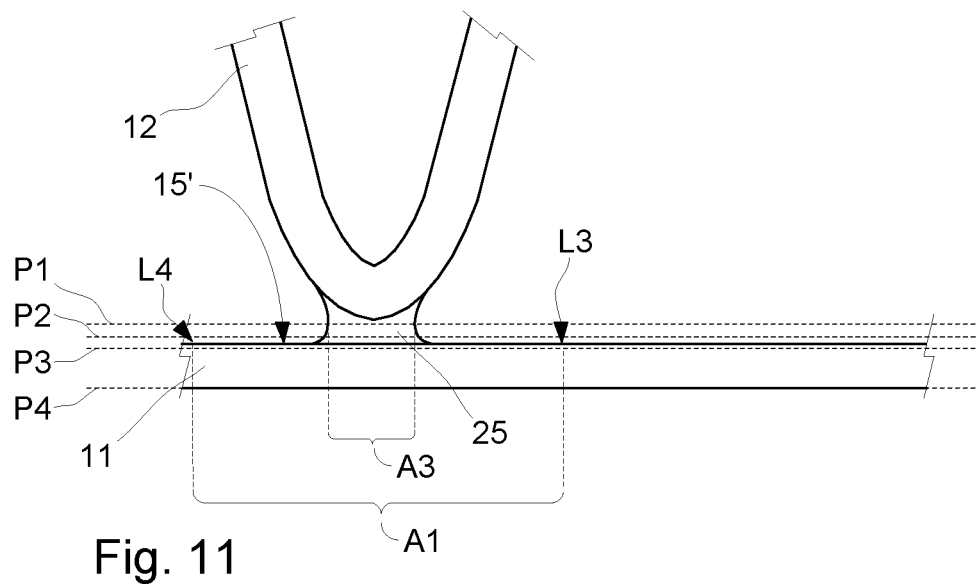
Figure 12:
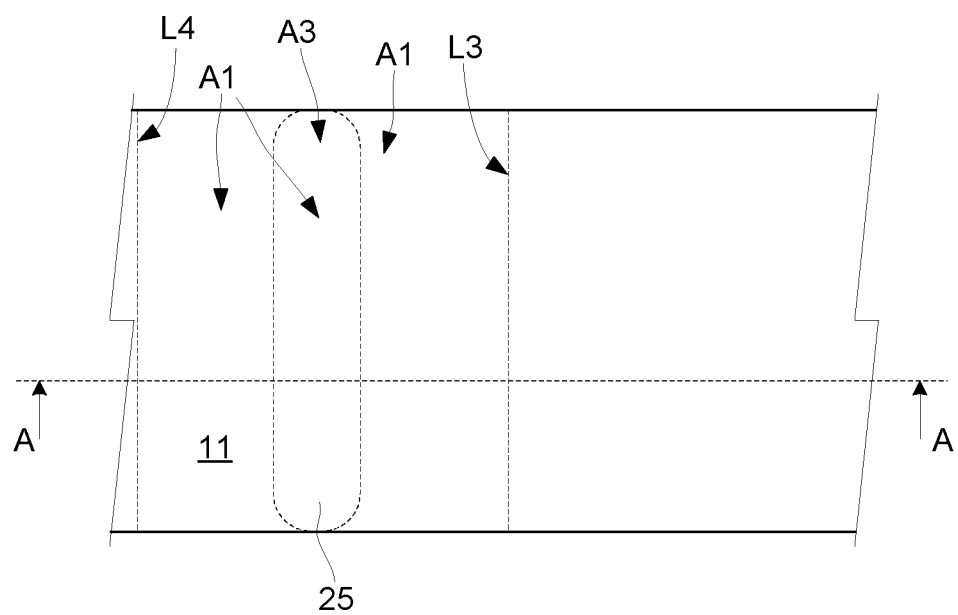
FIG. 12 shows a cross-sectional area of the joint.

FIG. 11 corresponds to FIG. 3 and shows a cross-sectional area A3 of the joint 25. The area A1 of the surface 15 on which the melting depressant composition 14 is applied may be according to another variant be at least 3 times larger than the cross-sectional area A3 of the joint 25. FIG. 12 shows the same metal parts 11, 12 but from above and in the second plane P2. FIG. 11 is a cross-sectional view as seen along line A-A in FIG. 12.

As may be seen, the joint 25 has a cross-sectional area A3 that is significantly smaller than the area A1 of the melting depressant composition 14 on the surface 15. As before, the area A1 may be defined as an area of the surface 15 on which melting depressant composition 14 is applied and from which area A1 metal is drawn to form the joint 25. The cross-sectional area A3 of the joint 25 may be defined as the smallest area the joint 25 has between the first metal part 11 and the second metal part 12. The cross-sectional area A3 may have the shape of a curved surface. Obviously, the areas A1 and A2 may have the shape of curved surfaces, depending on the respective shape of the first metal part 11 and the second metal part 12.

Figure 13:
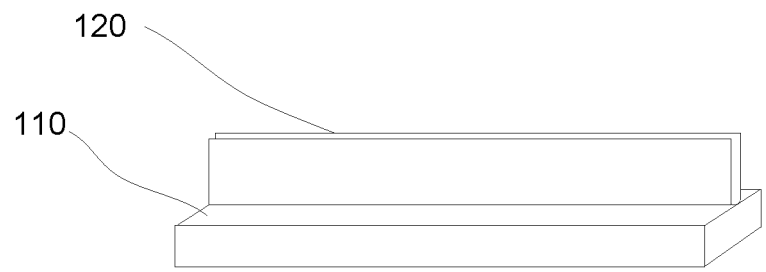
FIG. 13 shows metal parts used in the examples.

FIG. 13 shows a first metal part in the form of a plate 110 and a second metal part 120 which is a plate with the same outer dimensions, 20*40 mm, but was pressed to a shape of a U. The metal parts are used for exemplifying how two metal parts may be joined. The plate 110 is a rectangular plate, with a thickness of 0.4 mm and the dimensions of 20*40 mm and is made of stainless steel type 316L (SAE steel grade).

Figure 14:
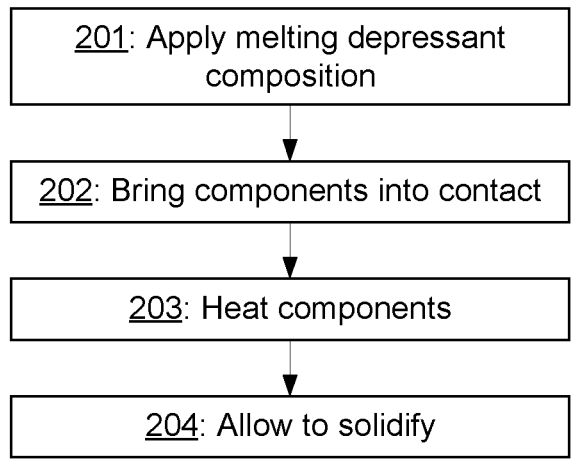
FIG. 14 is a flow chart of a method for joining a first and second metal part.

With reference to FIG. 14 a flow chart of a method for joining a first and second metal part is illustrated. The metal parts may be made of any of the materials as described above.

In a first step 201 the melting depressant composition is applied on the surface of at least one of the metal parts (here the first metal part). The application per se may be done by conventional techniques, e.g. by spraying or painting in case the melting depressant composition comprises a binder component, and by PVD or CVD in case not binder component is used.

A next step 202 the second metal part is brought into contact with the melting depressant composition at a contact point on the surface. This can be done manually or automatically by employing conventional, automated manufacturing systems.

In a next step 203 the metal parts are heated to a temperature which is above 1100° C. The exact temperature can be found the examples above. During the heating a surface of at least the first metal part melt and, together with the melting depressant component, forms a melted metal layer that is in contact with the second metal part at the contact point between the first metal part and the second metal part. When this happen, metal of the melted metal layer flows towards the contact point.

A final step 204 the melted metal layer is allowed to solidify, such that a joint is obtained at the contact point, i.e. the metal that has flown to the contact point solidifies. The solidification typically includes decreasing temperature to normal room temperature. However, solidification also occurs during the physical process of redistribution of components (boron and silicon) in the joint area, before a temperature is decreased.

A number of experiments and examples are now presented for describing suitable materials for the boron source of the melting depressant composition.

EXAMPLES

In the following examples more details are presented for illustrating the invention.

The tests in these examples were made to investigate if silicon, Si, was able to create a "braze alloy" when the silicon was applied on the surface of a test sample of parent metal (i.e. on a metal part). Also, different amounts of boron, B, were added for decreasing the melting point for the braze alloy. Boron is also used for changing the wetting behavior of the braze alloy. Properties of the tested blends were also investigated. In the examples wt % is percent by weight. Here, "braze alloy" is referred to as the alloy formed when the silicon and boron causes a part of, or layer of, the parent metal (metal part), to melt. The "braze alloy" thus comprises the blend and metallic elements from the parent metal.

If nothing else is stated the test samples of parent metal for all tests were cleaned by dish washing and with acetone before samples of the blends of silicon and boron were added to the test samples.

Test of Boron Sources.

Four commercially available new boron sources were tested, $TiB_2$, $Na_2B_4O_7$, $H_3BO_3$ and BN (the hexagonal form (h-BN)). $SiB_6$ was used as reference.

The boron sources were blended with Si to a ratio of app. 2:10, B:Si.

By using the molecule weight of all components in each boron source the amount of source was calculated so that the ratio was obtained. The factor presented in the table is the quota between the molecule weight of the boron source and the weight of the boron in the source and it was used when calculating the needed amount boron source for the blends. The calculations are presented in table 1.

TABLE 1

| Calculations: | | | | |
|---|---|---|---|---|
| | Molecule weight of boron source g/mol | Weight of B in the source B | % B in the boron source. % B | factor |
| $Na_2B_4O_7$ | 201.22 | 43.24 | 21.5 | 4.653 |
| $TiB_2$ | 69.49 | 21.62 | 31.1 | 3.214 |
| $H_3BO_3$ | 61.83 | 10.81 | 17.5 | 5.719 |
| BN | 24.82 | 10.81 | 43.6 | 2.296 |
| $SiB_6$ | 92.95 | 64.87 | 69.8 | 1.433 |

Blending of Powders

All boron sources used were powders. The used Si source was also a powder. After weighing the powders for each blend, the powders were firmly blended. The binder was then added with the weight and the blend was firmly blended again. The weights for the components are presented in table 2.

TABLE 2

| measured weights of ingoing component: | | | | |
|---|---|---|---|---|
| | B-source (g) | Si tot (g) | Total weight (g) | Added binder (g) |
| $Na_2B_4O_7$ | 9.3 | 10 | 19.3 | 15.14 |
| $TiB_2$ | 2.64 | 4.11 | 6.75 | 5.3 |

TABLE 2-continued measured weights of ingoing component:

| | B-source (g) | Si tot (g) | Total weight (g) | Added binder (g) |
|---|---|---|---|---|
| $H_3BO_3$ | 11.4 | 10.02 | 21.42 | 16.96 |
| BN | 4.60 | 10.01 | 14.61 | 12.92 |
| $SiB_6$ | 2.82 | 9.99 | 12.81 | 13.01 |

Applying Method and Sample Preparation

To obtain an even applying, a small hand screen printing equipment were used. The blends were screen printed on a plate sample of made of type 316L, with a thickness of 0.4 and the dimensions of 20*40 mm. The screen-printed area was 19*10 mm. The weight of all samples was measured before and after screen printing. The applied weight for braze cycle 1 (A), is presented in table 3 and for braze cycle 2 (B), in table 4. For the joining a second part were used. The second part was a plate with the same outer dimensions, 20*40 mm, but was pressed to a shape of a U. The samples were placed with the screen-printed area facing the pressed stainless-steel plate, so that a 2-dimensional joint was created between the screen-printed area and the pressed plate. The samples were placed in a fixture to ensure contact between the parts when brazed.

TABLE 3

Samples for the first braze, braze cycle (A)

| Sample # | B source | Plate (g) | Applied Plate, (g) | Applied amount (g) | W (mg)/ Area (10*19 mm2) |
|---|---|---|---|---|---|
| 1A | BN | 2.4953 | 2.5036 | 0.0083 | 0.044 |
| 2A | BN | 2.4941 | 2.5051 | 0.011 | 0.058 |
| 3A | $H_3BO_3$ | 2.4918 | 2.4961 | 0.0043 | 0.023 |
| 4A | $H_3BO_3$ | 2.4886 | 2.4928 | 0.0042 | 0.022 |
| 5A | $Na_2B_4O_7$ | 2.4883 | 2.4962 | 0.0079 | 0.042 |
| 6A | $Na2B4O7$ | 2.4875 | 2.4977 | 0.0102 | 0.054 |
| 7A | $TiB_2$ | 2.4895 | 2.498 | 0.0085 | 0.045 |
| zz8A | $TiB_2$ | 2.4884 | 2.5026 | 0.0142 | 0.075 |
| 9A | $SiB_6$ | 2.4897 | 2.501 | 0.0113 | 0.059 |
| 10A | $SiB_6$ | 2.4872 | 2.4993 | 0.0121 | 0.064 |

TABLE 4

Samples for the second braze, braze cycle (B)

| Sample # | B-source | plate (g) | Applied Plate, (g) | Applied amount (g) | W (mg)/ Area (10*19 mm2) |
|---|---|---|---|---|---|
| 1B | $SiB_6$ | 2.4822 | 2.4899 | 0.0077 | 0.041 |
| 2B | $SiB_6$ | 2.4848 | 2.4927 | 0.0079 | 0.042 |
| 3B | $SiB_6$ | 2.4817 | 2.4902 | 0.0085 | 0.045 |
| 4B | $SiB_6$ | 2.4856 | 2.4957 | 0.0101 | 0.053 |
| 5B | $SiB_6$ | 2.4959 | 2.5068 | 0.0109 | 0.057 |
| 6B | $TiB_2$ | 2.4962 | 2.5113 | 0.0151 | 0.079 |
| 7B | $TiB_2$ | 2.4937 | 2.504 | 0.0103 | 0.054 |
| 8B | $TiB_2$ | 2.4926 | 2.5048 | 0.0122 | 0.064 |
| 9B | $TiB_2$ | 2.4927 | 2.5042 | 0.0115 | 0.061 |
| 10B | $TiB_2$ | 2.4887 | 2.4998 | 0.0111 | 0.058 |
| 11B | $TiB_2$ | 2.4854 | 2.4973 | 0.0119 | 0.063 |
| 12B | $H_3BO_3$ | 2.4913 | 2.4957 | 0.0044 | 0.023 |
| 13B | $H_3BO_3$ | 2.494 | 2.499 | 0.005 | 0.026 |
| 14B | $H_3BO_3$ | 2.4974 | 2.5018 | 0.0044 | 0.023 |
| 15B | $H_3BO_3$ | 2.5004 | 2.5053 | 0.0049 | 0.026 |
| 16B | $H_3BO_3$ | 2.5002 | 2.5041 | 0.0039 | 0.021 |

Brazing

The brazing was performed in a vacuum furnace. The brazing temperature was 1225±5° C., for approximately 1 hour at the brazing temperature. Two brazing cycles were made, cycle 1 (A) and cycle 2 (B).

Results

The samples were analyzed by visual inspection and the results are presented in table 5 and 6.

TABLE 5 the results from braze cycle 1, (A).

| Sample # | B source | Results |
|---|---|---|
| 1A | BN | Bright surface, braze joint |
| 2A | BN | Bright surface, braze joint |
| 3A | $H_3BO_3$ | Bright surface, melted started, no or smal joint |
| 4A | $H_3BO_3$ | Bright surface, melted started, no or smal joint |
| 5A | $Na_2B_4O_7$ | Bright surface, melted started, no or smal joint |
| 6A | $Na_2B_4O_7$ | Bright surface, melted started, no or smal joint |
| 7A | $TiB_2$ | Dark surface, braze joint |
| 8A | $TiB_2$ | Dark surface, braze joint |
| 9A | $SiB_6$ | Bright surface, braze joint |
| 10A | $SiB_6$ | Bright surface, braze joint |

TABLE 6 the results from braze cycle 2, (B).

| Sample # | B source | Results |
|---|---|---|
| 1B | $SiB_6$ | Bright surface, braze joint |
| 2B | $SiB_6$ | Bright surface, braze joint |
| 3B | $SiB_6$ | Bright surface, braze joint |
| 4B | $SiB_6$ | Bright surface, braze joint |
| 5B | $SiB_6$ | Bright surface, braze joint |
| 6B | $TiB_2$ | Dark surface, braze joint |
| 7B | $TiB_2$ | Dark surface, braze joint |
| 8B | $TiB_2$ | Dark surface, braze joint |
| 9B | $TiB_2$ | Dark surface, braze joint |
| 10B | $TiB_2$ | Dark surface, braze joint |
| 11B | $TiB_2$ | Dark surface, braze joint |
| 12B | $H_3BO_3$ | Bright surface, melted started, no joint |
| 13B | $H_3BO_3$ | Bright surface, melted started, no joint |
| 14B | $H_3BO_3$ | Bright surface, melted started, small braze joint |
| 15B | $H_3BO_3$ | Bright surface, melted started, small braze joint |
| 16B | $H_3BO_3$ | Bright surface, melted started, small braze joint |

CONCLUSIONS

The tests showed that braze joints were obtained when using BN, $TiB_2$ and $SiB_6$ as boron sources and can therefore be used as B sources. The test also showed that $H_3BO_3$ and $Na_2B_4O_7$ had the potential to be used as alternative boron sources, but the effect was not as high as for the other B sources tested. This can probably be solved by inversing the amount of applied blend.

From the description above follows that, although various embodiments of the invention have been described and shown, the invention is not restricted thereto, but may also be embodied in other ways within the scope of the subject-matter defined in the following claims. Various melting depressant compositions can also be combined with various metals for the metal parts.

The invention claimed is:

1. A method for joining a first metal part with a second metal part, the metal parts having a solidus temperature above 1100° C., the method comprising:
    applying a melting depressant composition at least on a surface of the first metal part, the melting depressant composition comprising:

a melting depressant component comprising at least 25 wt % boron and silicon in total for decreasing a melting temperature of the first metal part; and optionally, a binder component for facilitating the applying of the melting depressant composition on the surface;

bringing the second metal part into contact with the melting depressant composition at a contact point on said surface;

heating the first and second metal parts to a temperature above 1100° C., said surface of the first metal part thereby melting such that a surface layer of the first metal part melts and, together with the melting depressant component, forms a molten metal layer that is in contact with the second metal part at the contact point; and allowing the molten metal layer to solidify, such that a joint is obtained at the contact point, wherein a source of the boron comprises a boron compound selected from any of the following compounds: titanium diboride, boron nitride and/or combinations thereof.

2. The method according to claim 1, wherein the boron compound provides 15-100 wt %, or 50 to 100 wt % of a total weight of the boron.

3. The method according to claim 1, wherein a source of the silicon comprises any of elemental silicon and silicon of a silicon compound selected from at least any of the following compounds: silicon carbide, silicon boride and ferrosilicon.

4. The method according to claim 1, wherein the melting depressant component comprises at least 40 wt % boron and silicon.

5. The method according to claim 1, wherein the melting depressant component comprises at least 85 wt % boron and silicon.

6. The method according to claim 1, wherein boron constitutes at least 10 wt % of the boron and silicon content of the melting depressant compound.

7. The method according to claim 1, wherein silicon constitutes at least 55 wt % of the boron and silicon content of the melting depressant compound.

8. The method according to claim 1, wherein the melting depressant component comprises less than 50 wt % metallic elements.

9. The method according to claim 1, wherein the melting depressant component comprises less than 10 wt % metallic elements.

10. The method according to claim 1, wherein the first metal part comprises a thickness of 0.1-1.0, or 0.6 to 1.0, or 0.3 to 0.6 mm and the applying of the melting depressant composition comprises applying an average of 0.02-0.12 mg boron and silicon per $mm^2$ on the surface of the first metal part.

11. The method according to claim 1, wherein the surface has an area that is larger than an area defined by the contact point on said surface, such that metal in the melted metal layer flows to the contact point when allowing the joint to form.

12. The method according to claim 1, wherein the first metal part comprises >50 wt % Fe, <13 wt % Cr, <1 wt % Mo, <1 wt % Ni and <3 wt % Mn.

13. The method according to claim 1, wherein the first metal part comprises >10 wt % Cr and >60 wt % Ni.

14. A product comprising a first metal part that is joined with a second metal part according to the method of claim 1.

15. A melting depressant composition for joining a first metal part with a second metal part according to the method of claim 1, the melting depressant composition comprising:
   i) a melting depressant component that comprises at least 25 wt % boron and silicon for decreasing a melting temperature; and
   ii), optionally, a binder component for facilitating applying of the melting depressant composition on the first metal part,
   wherein a source of the boron comprises a boron compound selected from any of the following compounds: titanium diboride and boron nitride.

16. The method according to claim 2, wherein a source of the silicon comprises any of elemental silicon and silicon of a silicon compound selected from at least any of the following compounds: silicon carbide, silicon boride and ferrosilicon.

17. The method according to claim 2, wherein the melting depressant component comprises at least 40 wt % boron and silicon.

18. The method according to claim 3, wherein the melting depressant component comprises at least 40 wt % boron and silicon.

19. The method according to claim 2, wherein the melting depressant component comprises at least 85 wt % boron and silicon.

20. The method according to claim 3, wherein the melting depressant component comprises at least 85 wt % boron and silicon.

* * * * *